(12) United States Patent
Fukawatase et al.

(10) Patent No.: US 9,738,243 B2
(45) Date of Patent: Aug. 22, 2017

(54) AIRBAG DEVICE FOR DRIVER'S SEAT

(71) Applicant: TOYOTA JIDOSHA KABUSHIKI KAISHA, Toyota-shi, Aichi-ken (JP)

(72) Inventors: Osamu Fukawatase, Miyoshi (JP); Atsushi Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/259,906

(22) Filed: Sep. 8, 2016

(65) Prior Publication Data

US 2017/0129444 A1    May 11, 2017

(30) Foreign Application Priority Data

Nov. 6, 2015    (JP) .................................. 2015-218646

(51) Int. Cl.

| B60R 21/233 | (2006.01) |
| B60R 21/2338 | (2011.01) |
| B60R 21/203 | (2006.01) |
| B60R 21/26 | (2011.01) |
| B60R 21/00 | (2006.01) |
| B60R 21/231 | (2011.01) |

(52) U.S. Cl.
CPC ........ *B60R 21/233* (2013.01); *B60R 21/2037* (2013.01); *B60R 21/2338* (2013.01); *B60R 21/26* (2013.01); *B60R 2021/0048* (2013.01); *B60R 2021/0058* (2013.01); *B60R 2021/23107* (2013.01); *B60R 2021/23308* (2013.01); *B60R 2021/23386* (2013.01)

(58) Field of Classification Search
CPC combination set(s) only.
See application file for complete search history.

(56) References Cited

U.S. PATENT DOCUMENTS 5,219,179 A * 6/1993 Eyrainer ............... B60R 21/239
                                                           280/739
6,152,481 A * 11/2000 Webber ................. B60R 21/232
                                                           280/728.2

(Continued)

FOREIGN PATENT DOCUMENTS

EP          1323618 A1    7/2003
JP       2006-205830 A    8/2006

(Continued)

*Primary Examiner* — Nicole T Verley
(74) *Attorney, Agent, or Firm* — Oliff PLC (57) ABSTRACT

An airbag device for a driver's seat, includes: a steering wheel; a wheel pad portion; a main body airbag that is configured to receive a supply of gas and to be inflated and deployed at a vehicle rear side of the steering wheel; a side portion chamber that is provided at a side portion in a vehicle transverse direction of the main body airbag, and that is configured to receive a supply of gas from the main body airbag and to be inflated and deployed from the side portion of the main body airbag toward the vehicle rear side; and a regulating tether that connects the main body airbag to a rear portion or a front-rear direction intermediate portion of the side portion chamber, and that restricts the side portion chamber from collapsing toward a side removed from a center of the main body airbag in the vehicle transverse direction.

18 Claims, 7 Drawing Sheets

(56) References Cited

U.S. PATENT DOCUMENTS

| | | | | |
|---|---|---|---|---|
| 6,419,262 | B1* | 7/2002 | Fendt | B60R 21/231 280/729 |
| 8,500,165 | B2* | 8/2013 | Kwon | B60R 21/239 280/738 |
| 9,187,055 | B1* | 11/2015 | Genthikatti | B60R 21/2338 |
| 9,272,684 | B1* | 3/2016 | Keyser | B60R 21/237 |
| 9,340,176 | B2* | 5/2016 | Belwafa | B60R 21/233 |
| 9,358,945 | B2* | 6/2016 | Yamada | B60R 21/233 |
| 9,376,084 | B2* | 6/2016 | Choi | B60R 21/233 |
| 9,463,763 | B2* | 10/2016 | Watamori | B60R 21/23138 |
| 9,499,118 | B2* | 11/2016 | Jindal | B60R 21/231 |
| 9,505,372 | B2* | 11/2016 | Yamada | B60R 21/2338 |
| 9,533,652 | B1* | 1/2017 | Paxton | B60R 21/239 |
| 9,550,469 | B2* | 1/2017 | Sato | B60R 21/231 |
| 9,555,762 | B2* | 1/2017 | Umehara | B60R 21/233 |
| 9,561,774 | B2* | 2/2017 | Cheng | B60R 21/203 |
| 2002/0125692 | A1* | 9/2002 | Brannon | B60R 21/232 280/730.2 |
| 2003/0214121 | A1* | 11/2003 | Miyata | B60R 21/231 280/730.1 |
| 2003/0218325 | A1* | 11/2003 | Hasebe | B60R 21/233 280/743.2 |
| 2004/0145161 | A1* | 7/2004 | Hasebe | B60R 21/233 280/729 |
| 2005/0206143 | A1* | 9/2005 | Webber | B60R 21/2338 280/736 |
| 2006/0151228 | A1* | 7/2006 | Kalliske | B60R 21/2338 180/274 |
| 2006/0163848 | A1 | 7/2006 | Abe | |
| 2008/0048420 | A1* | 2/2008 | Washino | B60R 21/203 280/731 |
| 2008/0073893 | A1* | 3/2008 | Schneider | B60R 21/2338 280/740 |
| 2008/0122205 | A1* | 5/2008 | Imamura | B60R 21/203 280/730.1 |
| 2008/0203710 | A1* | 8/2008 | Kalliske | B60R 21/233 280/729 |
| 2010/0059972 | A1* | 3/2010 | Kim | B60R 21/0136 280/728.2 |
| 2011/0309605 | A1* | 12/2011 | Kumagai | B60R 21/2338 280/741 |
| 2012/0193897 | A1* | 8/2012 | Ruedisueli | B60R 21/21 280/730.2 |
| 2012/0223550 | A1* | 9/2012 | Mazanek | B60R 21/207 297/216.1 |
| 2013/0001934 | A1* | 1/2013 | Nagasawa | B60R 21/233 280/731 |
| 2013/0147171 | A1* | 6/2013 | Shin | B60R 21/2338 280/743.2 |
| 2013/0200603 | A1* | 8/2013 | Bergenheim | B60R 21/36 280/762 |
| 2013/0234422 | A1* | 9/2013 | Wipasuramonton | B60R 21/232 280/730.2 |
| 2014/0008902 | A1* | 1/2014 | Schneider | B60R 21/2338 280/741 |
| 2014/0042732 | A1* | 2/2014 | Taguchi | B60R 21/233 280/729 |
| 2014/0333053 | A1* | 11/2014 | Thomas | B60R 21/2338 280/743.2 |
| 2015/0158452 | A1* | 6/2015 | Choi | B60R 21/233 280/732 |
| 2015/0166002 | A1* | 6/2015 | Fukawatase | B60R 21/233 280/730.1 |
| 2015/0258959 | A1* | 9/2015 | Belwafa | B60R 21/233 280/729 |
| 2015/0283971 | A1* | 10/2015 | Fischer | B60R 21/2338 280/742 |
| 2015/0298643 | A1* | 10/2015 | Schneider | B60R 21/233 280/729 |
| 2015/0307056 | A1* | 10/2015 | Cheng | B60R 21/231 280/729 |
| 2015/0321636 | A1* | 11/2015 | Jang | B60R 21/233 280/743.2 |
| 2015/0367802 | A1* | 12/2015 | Fukawatase | B60R 21/205 280/732 |
| 2016/0039385 | A1* | 2/2016 | Watamori | B60R 21/23138 280/730.1 |
| 2016/0046254 | A1* | 2/2016 | Yamada | B60R 21/233 280/729 |
| 2016/0046257 | A1* | 2/2016 | Yamada | B60R 21/2338 280/729 |
| 2016/0059817 | A1* | 3/2016 | Umehara | B60R 21/233 280/729 |
| 2016/0068131 | A1* | 3/2016 | Komatsu | B60R 21/233 280/730.1 |
| 2016/0096503 | A1* | 4/2016 | Lee | B60R 21/231 280/743.2 |
| 2016/0144820 | A1* | 5/2016 | Shin | B60R 21/239 280/735 |
| 2016/0159311 | A1* | 6/2016 | Yamada | B60R 21/233 280/729 |
| 2016/0159312 | A1* | 6/2016 | Sato | B60R 21/233 280/729 |
| 2016/0207490 | A1* | 7/2016 | Yamada | B60R 21/2338 |
| 2016/0311392 | A1* | 10/2016 | Jindal | B60R 21/231 |
| 2016/0339866 | A1* | 11/2016 | Pieruch | B60R 21/233 |
| 2016/0355152 | A1* | 12/2016 | Perez Garcia | B60R 21/233 |
| 2017/0015270 | A1* | 1/2017 | Ohno | B60R 21/233 |
| 2017/0021794 | A1* | 1/2017 | Sumiya | B60R 21/233 |
| 2017/0036639 | A1* | 2/2017 | Yamada | B60R 21/233 |

FOREIGN PATENT DOCUMENTS

| | | | | |
|---|---|---|---|---|
| JP | 2007-296980 | A | 11/2007 | |
| JP | 2008-062714 | A | 3/2008 | |
| JP | 2013-014176 | A | 1/2013 | |
| JP | 2015-116912 | A | 6/2015 | |
| JP | WO 2016147682 | A1 * | 9/2016 | B60R 21/205 |
| SE | 102014003234 | A1 * | 3/2015 | B60R 21/23 |

* cited by examiner

AIRBAG DEVICE FOR DRIVER'S SEAT

CROSS-REFERENCE TO RELATED APPLICATION

This application is based on and claims priority under 35 USC 119 from Japanese Patent Application No. 2015-218646 filed on Nov. 6, 2015, the disclosure of which is incorporated by reference herein.

BACKGROUND

Technical Field

The present invention relates to an airbag device for a driver's seat.

Related Art

There is an airbag device for a driver's seat that is equipped with a main body airbag that is inflated and deployed toward the vehicle rear side from a non-rotating wheel pad portion of a steering wheel, and a pair of side portion chambers (extending portions) that are inflated and deployed toward the vehicle rear side from side portions at both vehicle transverse direction sides of the main body airbag (refer to Japanese Patent Application Laid-Open (JP-A) No. 2013-014176).

In the technique disclosed in JP-A No. 2013-014176, in a case in which the head portion of the occupant who is seated in the driver's seat (hereinafter also called the "occupant head portion") moves toward a vehicle obliquely front side in conjunction with an oblique collision in which a collision body collides obliquely with respect to the vehicle front surface, the occupant head portion is restrained by one of the side portion chambers.

Note that, for example, European Patent No. 1323618, JP-A No. 2006-205830, JP-A No. 2007-296980, JP-A No. 2008-062714 and JP-A No. 2015-116912 are techniques relating to airbag devices, in addition to JP-A No. 2013-014176.

SUMMARY

However, in the technique disclosed in JP-A No. 2013-014176, in a case in which the occupant head portion is restrained by one side portion chamber, the side portion chamber collapses toward the side away from the center of the main body airbag in the vehicle transverse direction, and there is the possibility that the occupant head portion cannot be restrained sufficiently.

In view of the above-described circumstances, an object of the present disclosure is to provide an airbag device for a driver's seat that can suppress collapsing of a side portion chamber toward a side away from a center of a main body airbag in a vehicle transverse direction.

An airbag device for a driver's seat relating to a first aspect includes: a steering wheel that is rotatably supported at a vehicle body; a wheel pad portion that is provided at a central portion of the steering wheel, and that does not rotate with respect to the vehicle body; a main body airbag that is accommodated within the wheel pad portion, and that is configured to receive a supply of gas and to be inflated and deployed at a vehicle rear side of the steering wheel; a side portion chamber that is provided at a side portion in a vehicle transverse direction of the main body airbag, and that is configured to receive a supply of gas from the main body airbag and to be inflated and deployed from the side portion of the main body airbag toward the vehicle rear side; and a regulating tether that connects the main body airbag to a rear portion or a front-rear direction intermediate portion of the side portion chamber, and that restricts the side portion chamber from collapsing toward a side removed from a center of the main body airbag in the vehicle transverse direction.

In accordance with the above-described airbag device for a driver's seat, the steering wheel is supported so as to be able to rotate with respect to the vehicle body. The wheel pad portion is provided at the central portion of the steering wheel. The wheel pad portion does not rotate with respect to the vehicle body. The main body airbag is accommodated within the wheel pad portion.

Further, for example, if gas is supplied to the main body airbag in conjunction with an oblique collision, the main body airbag is inflated and deployed at the vehicle rear side of the steering wheel. Further, the side portion chamber is provided at the side portion in the vehicle transverse direction of the main body airbag. The side portion chamber is configured to receive a supply of gas from the main body airbag, and to be inflated and deployed from the side portion of the main body airbag toward the vehicle rear side.

Here, as described above, the main body airbag is accommodated within the wheel pad portion that does not rotate with respect to the vehicle body. Due thereto, even if the main body airbag and the side portion chamber are inflated and deployed in a state in which the steering wheel is rotated, the side portion chamber is disposed at the side portion in the vehicle transverse direction of the main body airbag. Due thereto, the occupant head portion, that has moved toward a vehicle obliquely front side in conjunction with an oblique collision, can be received by the side portion chamber.

Further, the main body airbag and the rear portion or the front-rear direction intermediate portion of the side portion chamber are connected by the regulating tether. As a result, in a case in which the occupant head portion is received by the side portion chamber, the side portion chamber is inhibited from collapsing toward the side removed from the center of the main body airbag in the vehicle transverse direction. Accordingly, the performance of restraining the occupant head portion by the side portion chamber improves.

In an airbag device for a driver's seat relating to a second aspect, in the airbag device for a driver's seat relating to the first aspect, wherein: the regulating tether has a main body side connecting portion that is connected to the main body airbag, and a chamber side connecting portion that is connected to the side portion chamber, and the chamber side connecting portion is positioned further toward the vehicle rear side than a center of gravity of an occupant head portion, when viewing, from a vehicle transverse direction outer side, a head portion contacting state in which the occupant head portion, which faces a vehicle front side, is made to contact both a rear surface at the vehicle rear side of the main body airbag that has been inflated and deployed and an inner side surface at a main body airbag side of the side portion chamber that has been inflated and deployed.

In accordance with the above-described airbag device for a driver's seat, the regulating tether has the main body side connecting portion that is connected to the main body airbag, and the chamber side connecting portion that is connected to the side portion chamber. The chamber side connecting portion is positioned further toward the vehicle rear side than the center of gravity of the occupant head portion, when viewing, from the vehicle transverse direction outer side, a head portion contacting state in which the occupant head portion, that faces the vehicle front side, is made to contact both the rear surface of the main body airbag that has been inflated and deployed and the inner side surface at the main body airbag side of the side portion chamber that has been inflated and deployed.

Due thereto, in the present aspect, collapse of the side portion chamber toward the side away from the center of the main body airbag in the vehicle transverse direction can be effectively suppressed as compared with a case in which the chamber side connecting portion is positioned further toward the vehicle front side than the center of gravity of the occupant head portion, when the head portion contacting state is viewed from the vehicle transverse direction outer side.

In an airbag device for a driver's seat relating to a third aspect, in the airbag device for a driver's seat relating to the second aspect, wherein, when the main body airbag that has been inflated and deployed is viewed from a height direction upper side of the main body airbag, the main body side connecting portion is positioned at an opposite side, in the vehicle transverse direction, from the side portion chamber with respect to a central line along a thickness direction of the main body airbag.

In accordance with the above-described airbag device for a driver's seat, when the main body airbag, that has been inflated and deployed, is viewed from the height direction upper side of the main body airbag, the main body side connecting portion of the regulating tether is positioned at the opposite side, in the vehicle transverse direction, of the side portion chamber with respect to the central line along the thickness direction of the main body airbag.

Here, when, in conjunction with an oblique collision, the occupant head portion contacts, with respect to the main body airbag, a side of the side portion chamber with respect to the central line along the thickness direction of the main body airbag, the side portion chamber side of the main body airbag is crushed. In this case, if the main body side connecting portion of the regulating tether is positioned at the side portion chamber side of the main body airbag, in conjunction with the crushing of the side portion chamber side at the main body airbag, the main body side connecting portion moves, and there is the possibility that flexure will arise at the regulating tether. Further, when flexure arises at the regulating tether, there is the possibility that the time until collapsing of the side portion chamber is regulated by the regulating tether will be delayed.

In contrast, in the present aspect, as described above, when the main body airbag that has been inflated and deployed is viewed from the height direction upper side, the main body side connecting portion of the regulating tether is positioned at the opposite side, in the vehicle transverse direction, of the side portion chamber with respect to the central line along the thickness direction of the main body airbag.

Due thereto, even if the side portion chamber side of the main body airbag is crushed, the amount of movement of the main body side connecting portion of the regulating tether is small, and therefore, flexure of the regulating tether is suppressed. Accordingly, collapse of the side portion chamber can be restricted by the regulating tether at an early stage.

In an airbag device for a driver's seat relating to a fourth aspect, in the airbag device for a driver's seat relating to the second aspect or the third aspect, wherein: the chamber side connecting portion is provided at an upper surface of the side portion chamber, the main body side connecting portion is provided at an upper surface of the main body airbag, and when the head portion contacting state is viewed from the vehicle transverse direction outer side, the chamber side connecting portion and the main body side connecting portion are positioned further toward a vehicle upper side than the occupant head portion.

In the above-described airbag device for a driver's seat, the chamber side connecting portion of the regulating tether is provided at the upper surface of the side portion chamber. Further, the main body side connecting portion of the regulating tether is provided at the upper surface of the main body airbag. When the head portion contacting state is viewed from the vehicle transverse direction outer side, the chamber side connecting portion and the main body side connecting portion are positioned further toward the vehicle upper side than the occupant head portion.

Due thereto, when the occupant head portion moves toward a vehicle obliquely front side in conjunction with an oblique collision, the occupant head portion interfering with the regulating tether is suppressed. Accordingly, damage to the regulating tether is suppressed.

In an airbag device for a driver's seat relating to a fifth aspect, in the airbag device for a driver's seat relating to any one of the second aspect through the fourth aspect, wherein, when the head portion contacting state is viewed from the vehicle transverse direction outer side, the center of gravity of the occupant head portion overlaps with the side portion chamber.

In accordance with the above-described airbag device for a driver's seat, when the head portion contacting state is viewed from the vehicle transverse direction outer side, the center of gravity of the occupant head portion overlaps with the side portion chamber. Due thereto, the center of gravity of the occupant head portion, that moves toward a vehicle obliquely front side in conjunction with an oblique collision, can be received by the side portion chamber. Accordingly, the performance of restraining the occupant head portion by the side portion chamber improves.

As described above, in accordance with the above-described airbag device for a driver's seat, collapse of the side portion chamber toward the side removed from the center of the main body airbag in the vehicle transverse direction can be suppressed.

BRIEF DESCRIPTION OF THE DRAWINGS

Exemplary embodiments of the present disclosure will be described in detail based on the following figures, wherein.

DETAILED DESCRIPTION

An airbag device 10 for a driver's seat that relates to an embodiment is described hereinafter with reference to the drawings. Note that arrow FR that is shown appropriately in the respective drawings indicates the vehicle front side (the vehicle front-rear direction front side), and arrow UP indicates the vehicle upper side (the vehicle vertical direction upper side). Further, arrow LH indicates a vehicle transverse direction outer side (the left side when facing the vehicle front side). Further, front-rear, vertical, and left and right in the following description mean the front-rear of the vehicle front-rear direction, the vertical of the vehicle vertical direction, and the left and right of the vehicle transverse direction, respectively, unless otherwise indicated.

Figure 1:
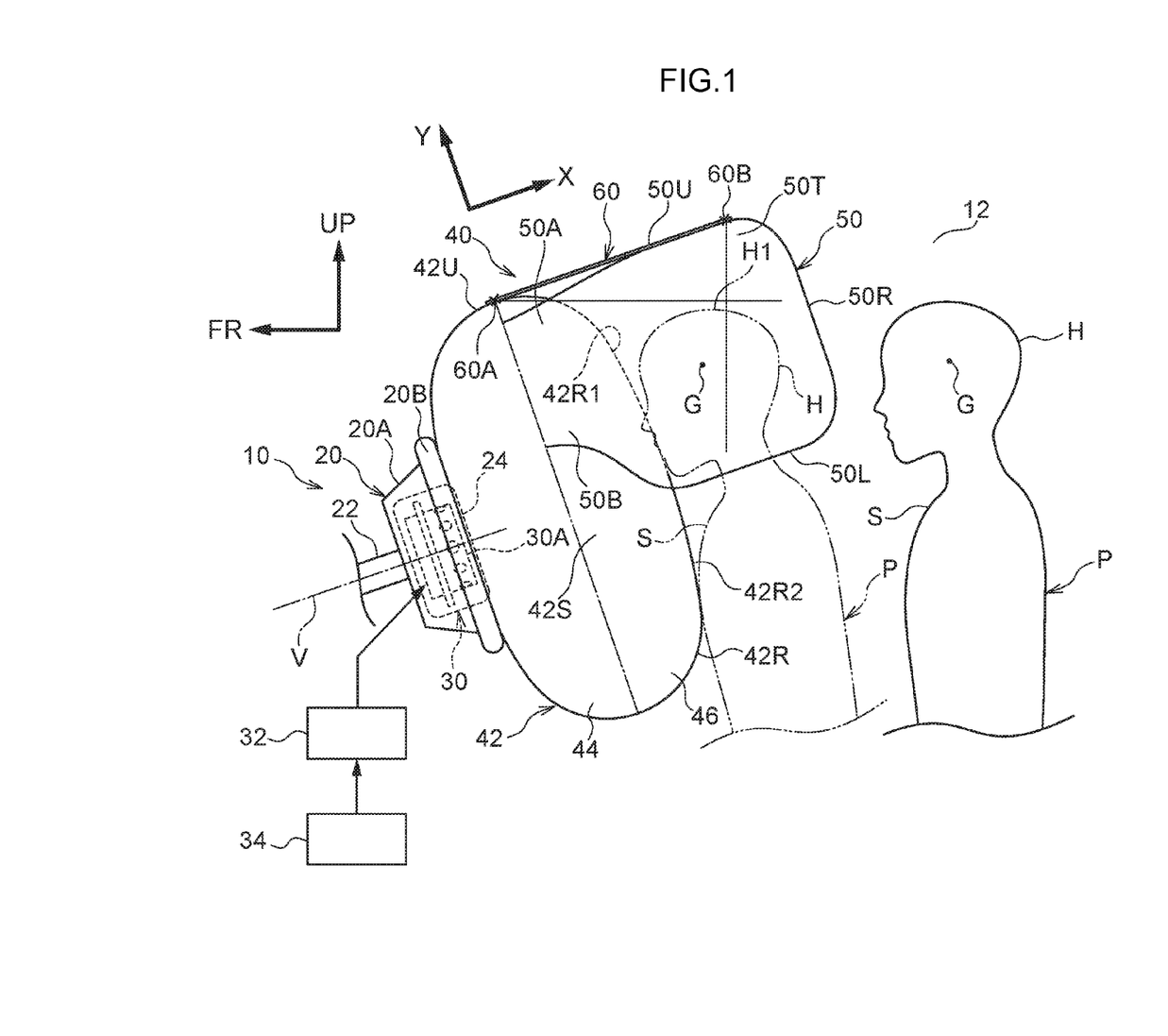
FIG. 1 is a side view in which a steering wheel, to which an airbag device for a driver's seat relating to an embodiment is applied, is viewed from a vehicle transverse direction outer side, and is a side view showing a state in which a driver's seat airbag has inflated and deployed.

A steering wheel 20 of a vehicle, to which the airbag device 10 for a driver's seat relating to the present embodiment is applied, is shown in FIG. 1. Note that, in the present embodiment, the steering wheel 20 and an unillustrated driver's seat (front seat) are provided at the left front side with respect to the vehicle transverse direction center at a cabin 12. On the other hand, an unillustrated front occupant's seat is provided at the right front side with respect to the vehicle transverse direction center at the cabin 12.

A crash test dummy (a dummy mannequin) P that simulates an occupant is seated (set) in the driver's seat. A Hybrid-3 AM 50 (50th percentile U.S. adult male) that is World SID (internationally standardized side crash dummies: World Side Impact Dummies) or a THOR dummy, or the like is used as the dummy P.

The dummy P is seated in the driver's seat in a standard seated posture that is prescribed by the crash test method. Further, the vehicle front-rear direction position of a seat cushion of the driver's seat with respect to the steering wheel 20, and the angle of inclination of a seatback with respect to the seat cushion, are adjusted to standard set positions that correspond to the aforementioned seated posture of the dummy P. Note that, hereinafter, for convenience of explanation, the dummy P is called occupant P. Further, head portion H of the dummy P is called occupant head portion H, and shoulder portion S of the dummy P is called occupant shoulder portion S.

The steering wheel 20 has a wheel main body 20A and a rim 20B. The wheel main body 20A projects-out toward the vehicle rear side (the driver's seat side) from an unillustrated instrument panel that forms the front wall portion of the cabin 12, and is fixed by a locknut to the rear end portion of a steering shaft 22 that is rotatably supported at the vehicle body. This wheel main body 20A can rotate, together with the steering shaft 22, with respect to the vehicle body.

The rim 20B is formed in the shape of a ring, and is disposed coaxially to the steering shaft 22. This rim 20B rotates integrally with the wheel main body 20A with respect to the vehicle body. Further, rotational axis V of the steering wheel 20 (the steering shaft 22) extends in the vehicle front-rear direction, and is inclined, with respect to the vehicle front-rear direction, so as to head toward the vehicle upper side while heading toward the vehicle rear side.

A wheel pad portion 24 is provided at a central portion of the steering wheel 20 (the rim 20B). The wheel pad portion 24 does not rotate with respect to the vehicle body. In short, the wheel pad portion 24 is structured so as to not rotate even if the steering wheel 20 is rotated with respect to the vehicle body by a known mechanism (a non-rotary mechanism) that uses a planetary gear mechanism or the like.

The airbag device 10 for a driver's seat is equipped with an inflator 30 and a driver's seat airbag 40. The inflator 30 that serves as a gas supplying device is provided at the steering wheel 20. Further, the inflator 30 is accommodated, together with the driver's seat airbag 40, within the wheel pad portion 24. The inflator 30 has a gas jetting portion 30A that jets gas out into a main body airbag 42 that is described later.

An unillustrated ignition device (squib) is provided at the axially central portion of the inflator 30. An airbag ECU 32 that serves as a control device is electrically connected to this ignition device. Operation of the inflator 30 is controlled by the airbag ECU 32, and the inflator 30 generates gas at the time of a collision or at the time when a collision is predicted. Concretely, a collision sensor 34 is electrically connected to the airbag ECU 32.

The collision sensor 34 can sense or predict various types of front collisions such as a full overlap collision, an oblique collision and a small overlap collision. This collision sensor 34 outputs, to the airbag ECU 32, a collision signal (collision information) that expresses that a collision has been sensed or predicted. On the basis of the collision signal inputted from the collision sensor 34, the airbag ECU 32 operates the inflator 30 at the time of a collision or at the time when a collision is predicted, and causes gas to be jetted-out from the gas jetting portion 30A of the inflator 30.

Note that what is called "small overlap collision" here means a form of a collision in which a collision body collides with the vehicle front surface at further toward the vehicle transverse direction outer side than the front side member.

The driver's seat airbag 40 is accommodated in a folded-up state within the wheel pad portion 24. The driver's seat airbag 40 has the main body airbag 42 and a pair of side portion chambers 50. The main body airbag 42 receives a supply of gas from the inflator 30, and is inflated and deployed at the vehicle rear side of the steering wheel 20. In other words, the main body airbag 42 is inflated and deployed between the rim 20B of the steering wheel 20 and the occupant head portion H. Further, an unillustrated tear portion, that is ruptured in conjunction with the inflation and deployment of the driver's seat airbag 40, is formed in the wheel pad portion 24 at the portion thereof that faces the occupant head portion H.

Note that arrow X that is shown appropriately in the respective drawings indicates the thickness direction rear side of the main body airbag 42 that has been inflated and deployed. Further, arrow Y indicates the height direction upper side of the main body airbag 42 (the driver's seat airbag 40) that has been inflated and deployed. Moreover, the transverse direction of the main body airbag 42 coincides with the vehicle transverse direction.

Figure 2:
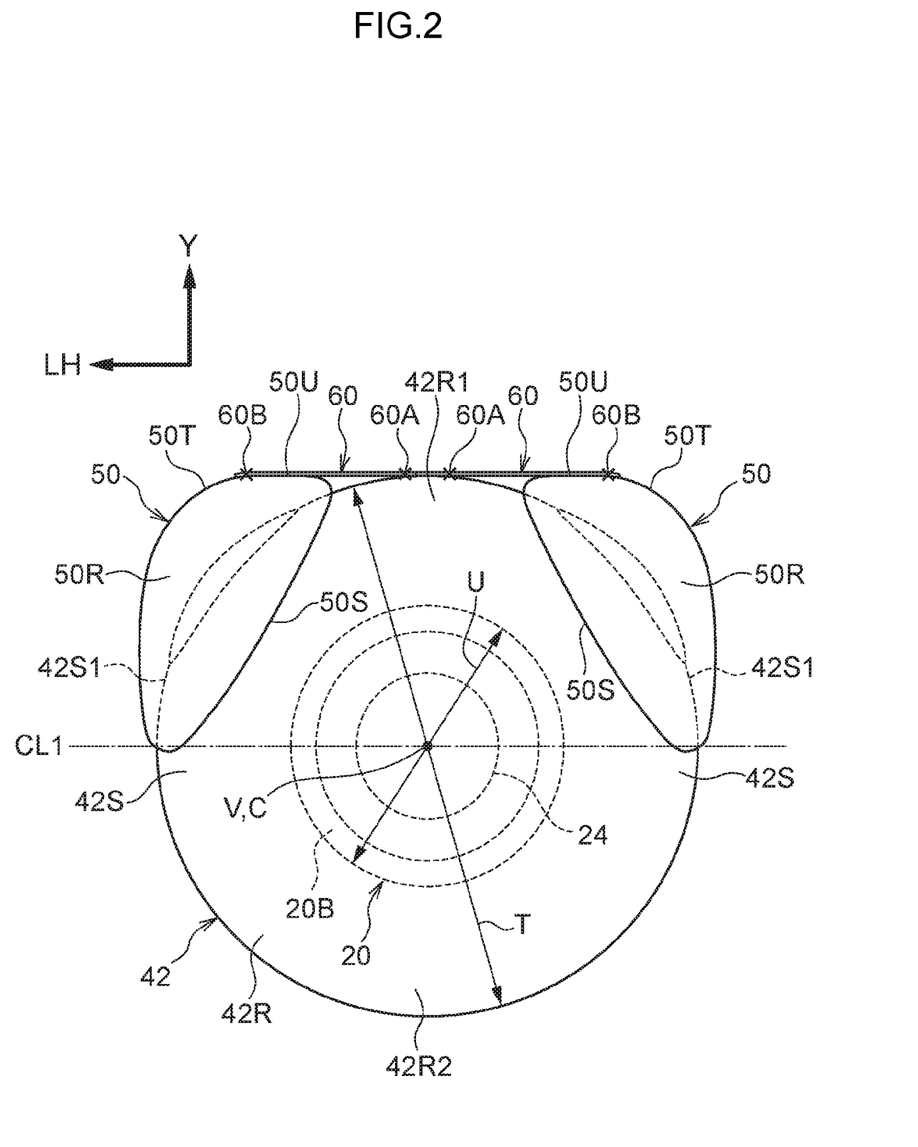
FIG. 2 is a rear view in which a main body airbag and a pair of side portion chambers that are shown in FIG. 1 are viewed from a thickness direction rear side of the main body airbag.

The main body airbag 42 is inflated and deployed in the shape of a flat sphere with the thickness direction thereof (the arrow X direction) being the axial direction of the steering wheel 20 (the V direction). As shown in FIG. 2, when the main body airbag 42 is viewed from the thickness direction rear side, the main body airbag 42 is formed in a circular shape. Note that the main body airbag 42 in the following description means the main body airbag 42 that is in the inflated and deployed state, unless otherwise stated.

When the main body airbag 42 is viewed from the thickness direction rear side, outer diameter T of the main body airbag 42 is set to be greater than outer diameter U of the rim 20B of the steering wheel 20 (T>U). A rear surface 42R (hereinafter called "airbag rear surface") at the vehicle rear side of the main body airbag 42 is a contact region (restraining region) that is contacted by the occupant head portion H and the occupant shoulder portion S that have inertially moved toward the vehicle front side in conjunction with any of various types of front collisions.

More concretely, as seen from the thickness direction rear side of the main body airbag 42, the region, that is at the vehicle upper side of the airbag rear surface 42R with respect to a central line CL1 along the transverse direction (the vehicle transverse direction) and passes-through center C of the main body airbag 42, is a head portion contact region 42R1. On the other hand, the region, that is at the vehicle lower side of the airbag rear surface 42R with respect to the central line CL1, is a shoulder portion contact region 42R2. Note that the "center C of the main body airbag 42" means the centroid of the main body airbag 42 when the main body airbag 42 is viewed from the thickness direction rear side.

The pair of side portion chambers 50 are provided at side portions 42S at the vehicle transverse direction both sides of the main body airbag 42. More concretely, the pair of side portion chambers 50 are provided at edge portions 42S1 of the side portions 42S at the vehicle transverse direction both sides of the head portion contact region 42R1.

Figure 3:
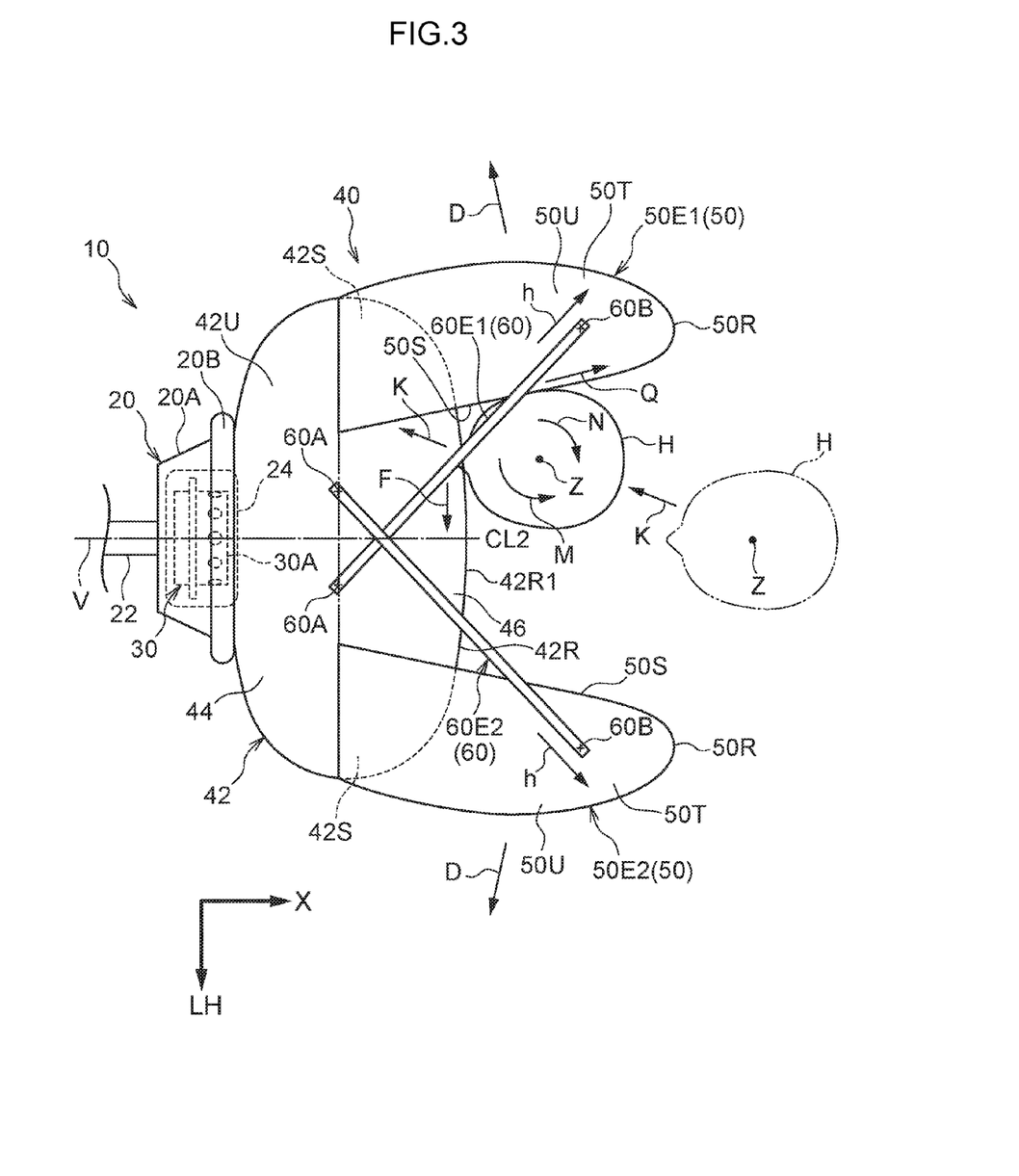
FIG. 3 is a top view in which a state, in which a occupant head portion shown in FIG. 1 has moved toward a vehicle obliquely front side, is seen from a height direction upper side of the driver's seat airbag.

As shown in FIG. 3, the pair of side portion chambers 50 receive a supply of gas from the main body airbag 42, and are respectively inflated and deployed toward the vehicle rear side (the arrow X side) from the side portions 42S of the main body airbag 42. In further detail, the pair of side portion chambers 50 receive a supply of gas from the inflator 30 via the main body airbag 42, and are inflated and deployed toward the vehicle rear side from the side portions 42S of the main body airbag 42. This pair of side portion chambers 50 are inflated and deployed in the shapes of walls that extend in the vehicle front-rear direction, as seen from the height direction upper side of the main body airbag 42.

Note that the side portion chambers 50 in the following description means the side portion chambers 50 in their inflated and deployed states, unless otherwise indicated. Further, in the following description, the state in which the occupant head portion H that is facing the vehicle front side is made to contact both the airbag rear surface 42R of the main body airbag 42 and an inner side surface 50S at the main body airbag 42 center C side (see FIG. 2) of the side portion chamber 50, is a head portion contacting state. Further, what is meant here by the occupant head portion H contacting the airbag rear surface 42R of the main body airbag 42 is a state in which the occupant head portion H is made to contact the airbag rear surface 42R slightly such that the main body airbag 42 is not crushed. In the same way, the occupant head portion H contacting the inner side surface 50S of the side portion chamber 50 means that the occupant head portion H is made to contact the inner side surface 50S slightly such that the side portion chamber 50 is not crushed.

As shown in FIG. 1, the side portion chambers 50 are inflated and deployed toward the vehicle rear side and the vehicle upper side, as seen from the vehicle transverse direction outer side. When the inflated and deployed state of the side portion chamber 50 is viewed from the vehicle transverse direction outer side, the side portion chamber 50 is formed in a substantially rectangular shape. Further, the side portion chamber 50 has an upper surface 50U, a lower surface 50L and a rear surface 50R.

Further, when the head portion contacting state is viewed from the vehicle transverse direction outer side, the positional relationship between the side portion chamber 50 and center of gravity G of the occupant head portion H is as follows. Namely, the upper surface 50U of the side portion chamber 50 is disposed further toward the vehicle upper side than the center of gravity G of the occupant head portion H. Further, the lower surface 50L of the side portion chamber 50 is disposed further toward the vehicle lower side than the center of gravity G of the occupant head portion H. Moreover, the rear surface 50R of the side portion chamber 50 is disposed further toward the vehicle rear side than the center of gravity G of the occupant head portion H. Due thereto, at the time of an oblique collision, the center of gravity G of the occupant head portion H can be received by the side portion chamber 50. Note that, in the present embodiment, the side portion chambers 50 overlap with the entire occupant head portion H.

Further, as shown in FIG. 3, the upper surfaces 50U of rear portions 50T of the pair of side portion chambers 50 are respectively connected to an upper surface 42U of the main body airbag 42 by a pair of regulating tethers 60. Collapsing-in of the pair of side portion chambers 50 toward sides (arrow D sides) away from the center C of the main body airbag 42 in the vehicle transverse direction is regulated by the pair of regulating tethers 60 respectively.

Concretely, the regulating tethers 60 are formed in the shapes of elongated strips from the same base cloths as the main body airbag 42 and the side portion chambers 50 for example. Length direction one end portions of the regulating tethers 60 are main body side connecting portions 60A that are connected by sewing to the upper surface 42U of the main body airbag 42. On the other hand, the length direction other end portions of the regulating tethers 60 are chamber side connecting portions 60B that are connected by sewing to the upper surfaces 50U of the rear portions 50T of the side portion chambers 50.

The regulating tethers 60 are stretched between the upper surface 42U of the main body airbag 42 and the upper surfaces 50U of the side portion chambers 50 in a state of being tensed by receiving tensile force h from the rear portions 50T of the side portion chambers 50, that are in the inflated and deployed states. Further, when the occupant head portion H moves toward an obliquely front side and contacts the side portion chamber 50 in conjunction with an oblique collision, collapsing-in of that side portion chamber 50 toward the side (the arrow D side) away from the center C of the main body airbag 42 in the vehicle transverse direction, is regulated by the regulating tether 60.

As shown in FIG. 1, when the head portion contacting state is viewed from the vehicle transverse direction outer side, the main body side connecting portions 60A and the chamber side connecting portions 60B are positioned further toward the vehicle upper side than top portion H1 of the occupant head portion H. Due thereto, in a case in which the occupant head portion H moves toward the vehicle front side or a vehicle obliquely front side in conjunction with a collision, the occupant head portion H interfering with the regulating tethers 60 is suppressed.

Further, when the head portion contacting state is seen from the vehicle transverse direction outer side, the chamber side connecting portions 60B are positioned further toward the vehicle rear side than the center of gravity G of the occupant head portion H. Due thereto, collapsing-in of the side portion chambers 50 toward the sides away from the center C of the main body airbag 42 is effectively suppressed.

Further, as shown in FIG. 3, of the pair of side portion chambers 50, the one (the right side) side portion chamber 50 is side portion chamber 50E1, and the other (the left side) side portion chamber 50 is side portion chamber 50E2. Further, the regulating tether 60 that connects the one side portion chamber 50E1 and the main body airbag 42 is regulating tether 60E1, and the regulating tether 60 that connects the other side portion chamber 50E2 and the main body airbag 42 is regulating tether 60E2.

In this case, when the main body airbag 42 is viewed from the height direction upper side, the main body side connecting portion 60A of the one regulating tether 60E1 is positioned at the side opposite the one side portion chamber 50E1, with respect to central line CL2 along the thickness direction of the main body airbag 42 (the arrow X direction). Similarly, when the main body airbag 42 is viewed from the height direction upper side, the main body side connecting portion 60A of the other regulating tether 60E2 is positioned at the side opposite the other side portion chamber 50E2, with respect to the central line CL2 of the main body airbag 42. Note that, hereinafter, the side portion chambers 50E1, 50E2 collectively are called the side portion chambers 50, and the regulating tethers 60E1, 60E2 collectively are called the regulating tethers 60.

Figure 4A:
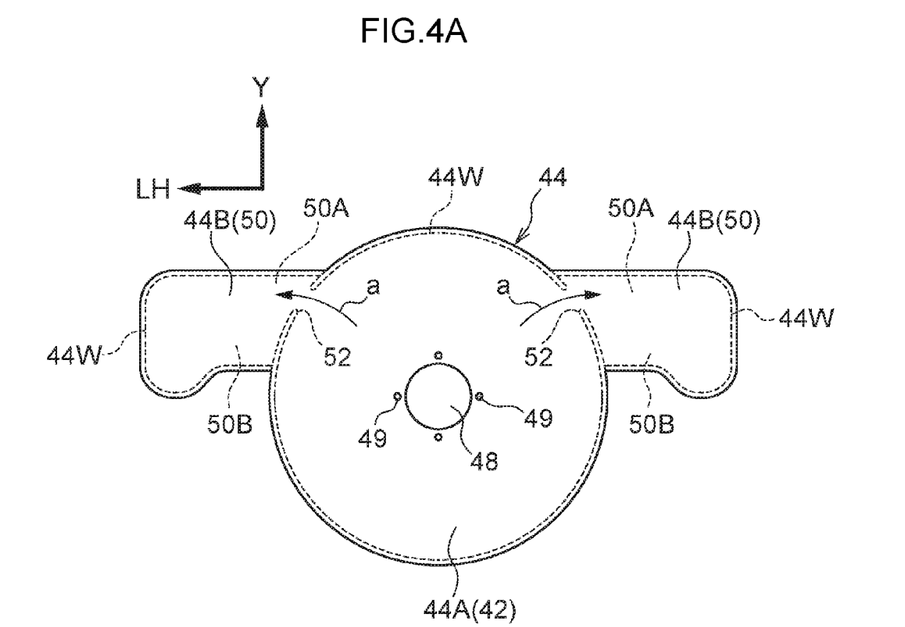
FIG. 4A is a planarly expanded view of an opposite-occupant-side base cloth of the driver's seat airbag shown in FIG. 1.
Figure 4B:
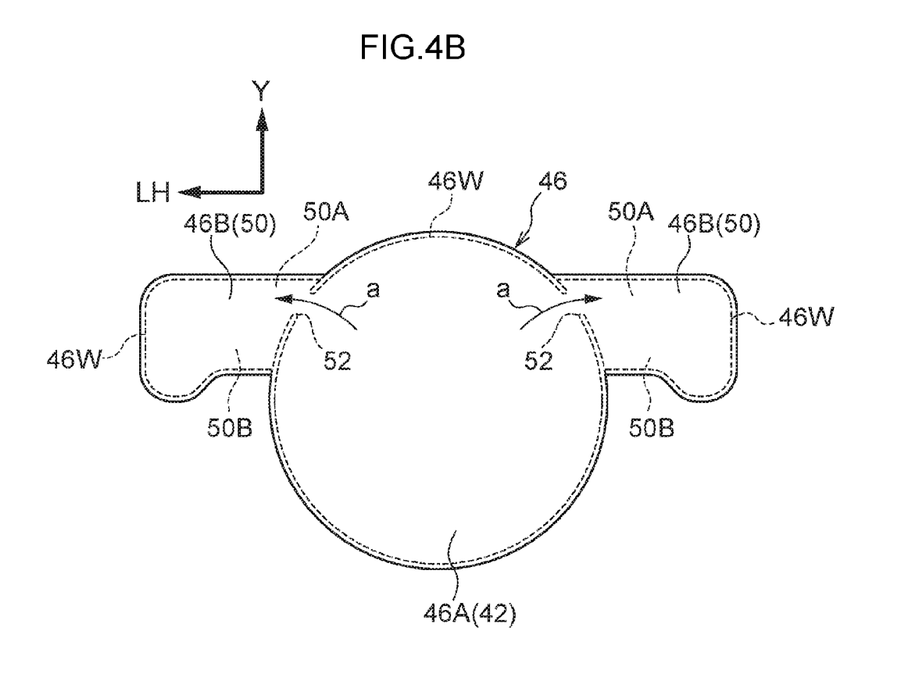
FIG. 4B is a planarly expanded view of a occupant-side base cloth of the driver's seat airbag shown in FIG. 1.

Here, the driver's seat airbag 40 has a occupant-side base cloth 46 that is disposed at the occupant P side, and an opposite-occupant-side base cloth 44 that is disposed at the opposite side in the thickness direction of the main body airbag 42 with respect to the occupant P, i.e., at the steering wheel 20 side. As shown in FIG. 4A and FIG. 4B, the opposite-occupant-side base cloth 44 and the occupant-side base cloth 46 are joined together by sewing at respective joined portions 44W, 46W. Due thereto, the driver's seat airbag 40 that is bag-shaped is formed.

Concretely, as shown in FIG. 4A, the opposite-occupant-side base cloth 44 has a main body base cloth portion 44A and a pair of chamber base cloth portions 44B. The main body base cloth portion 44A is formed in a circular shape in a planarly expanded state. The pair of chamber base cloth portions 44B extend-out toward the transverse direction outer sides of the main body base cloth portion 44A respectively from the vehicle transverse direction both side end portions of the upper portion of the main body base cloth portion 44A.

Note that an insert hole 48, in which the gas jetting portion 30A (see FIG. 1) of the inflator 30 is inserted, is formed in the central portion of the main body base cloth portion 44A. Further, plural mounting holes 49, in which are inserted unillustrated bolts for fixing the main body base cloth portion 44A to the inflator 30, are formed in the main body base cloth portion 44A at the periphery of the insert hole 48.

As shown in FIG. 4B, the occupant-side base cloth 46 has a main body base cloth portion 46A and a pair of chamber base cloth portions 46B. The main body base cloth portion 46A is formed in a circular shape in a planarly expanded state. The pair of chamber base cloth portions 46B extend-out toward the transverse direction outer sides of the main body base cloth portion 46A respectively from the vehicle transverse direction both side end portions of the upper portion of the main body base cloth portion 46A.

The main body base cloth portion 44A and the main body base cloth portion 46A are joined by sewing in a state in which the joined portions (sewn portions) 44W, 46W at the respective outer peripheral edge portions thereof are superposed together. Due thereto, the main body airbag 42 that is shaped as a bag is formed. Further, the chamber base cloth portions 44B and the chamber base cloth portions 46B are joined by sewing in a state in which the joined portions 44W, 46W that are provided at the respective outer peripheral edge portions thereof are superposed together. Due thereto, the side portion chambers 50 that are shaped as bags are formed.

Further, non-joined portions (non-sewn portion) that are not joined (sewn) together are provided at the outer peripheral edge portions of the main body base cloth portion 44A and the main body base cloth portion 46A. Connection holes 52, that connect (communicate) the interior of the main body airbag 42 and the interiors of the side portion chambers 50, are formed by these non-joined portions. Gas is supplied via the connection holes 52 from the interior of the main body airbag 42 to the interiors of the pair of side portion chambers 50 (arrows a).

Further, the connection holes 52 connect (communicate) upper portions 50A of the side portion chambers 50 and the main body airbag 42. Due thereto, when gas is supplied from the connection holes 52 to the side portion chambers 50, the upper portions 50A of the side portion chambers 50 are inflated and deployed before lower portions 50B.

Operation of the present embodiment is described next.

As shown in FIG. 1, when the airbag ECU 32 senses or predicts any of various types of collisions on the basis of a collision signal from the collision sensor 34, the airbag ECU 32 operates the inflator 30. Due thereto, gas is supplied from the gas jetting portion 30A of the inflator 30 to the interior of the main body airbag 42, and the main body airbag 42 is inflated and deployed at the vehicle rear side of the steering wheel 20. At this time, the wheel pad portion 24 is ruptured by the inflation pressure of the main body airbag 42.

Further, when gas is supplied from the inflator 30 to the interior of the main body airbag 42, as shown by arrows a in FIG. 4A, gas is supplied from the interior of the main body airbag 42 via the connection holes 52 to the interiors of the pair of side portion chambers 50. Due thereto, the pair of side portion chambers 50 are inflated and deployed toward the vehicle rear side from the side portions 42S at the both sides of the main body airbag 42.

Here, the driver's seat airbag 40 is accommodated within the wheel pad portion 24 that does not rotate with respect to the vehicle body. Due thereto, even in a case in which the driver's seat airbag 40 is inflated and deployed in a state in which the steering wheel 20 is rotated, the pair of side portion chambers 50 are disposed at the vehicle transverse direction both sides of the main body airbag 42.

Figure 5:
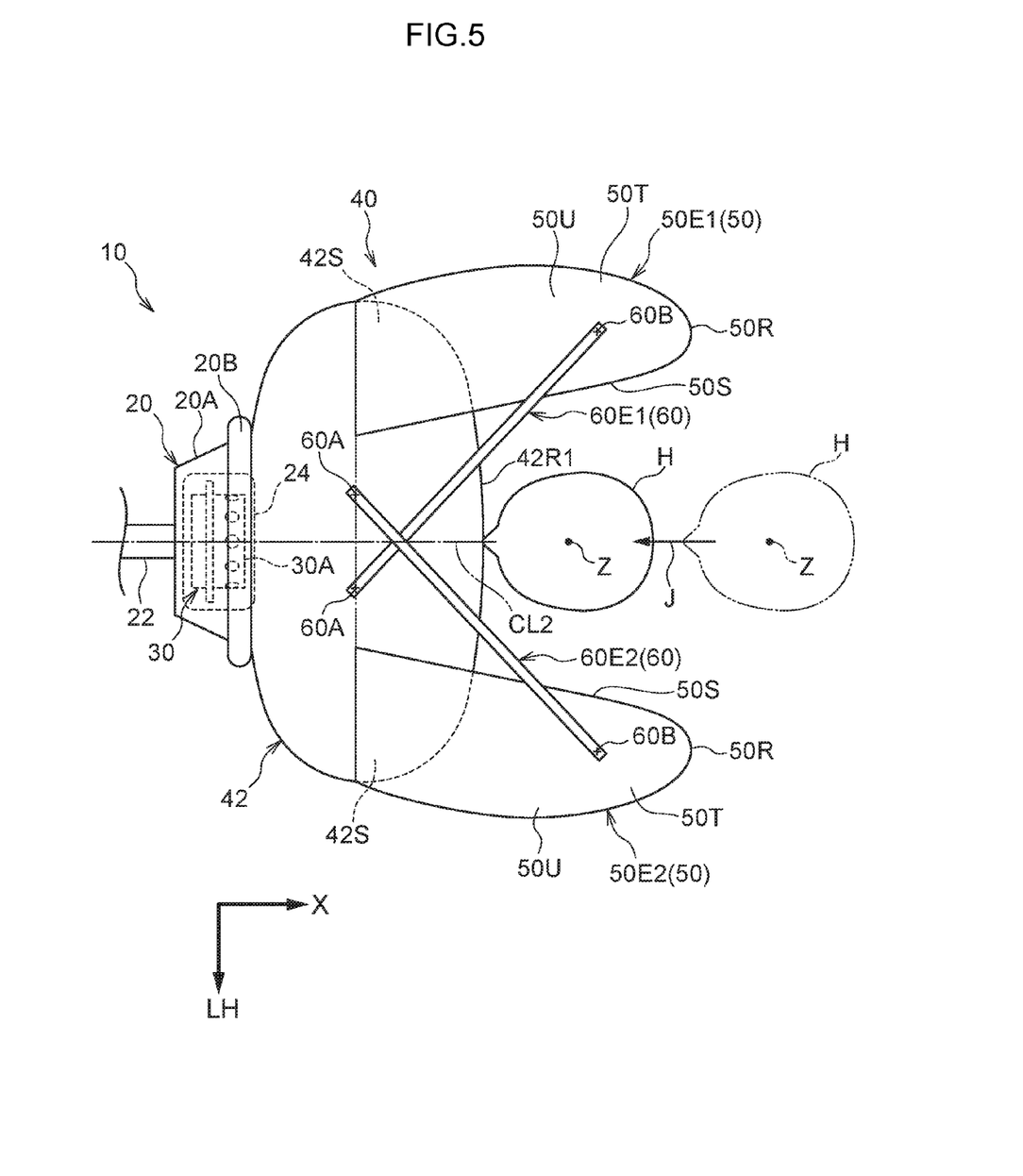
FIG. 5 is a top view in which a state, in which the occupant head portion shown in FIG. 1 has moved toward the vehicle front side, is seen from the height direction upper side of the driver's seat airbag.

Further, at the time of a full overlap collision (a head-on collision) with respect to the vehicle front surface, as shown by arrow J in FIG. 5, the occupant head portion H moves toward the vehicle front side. This occupant head portion H passes between the pair of side portion chambers 50, and is made to contact the airbag rear surface 42R of the main body airbag 42. Due thereto, the occupant head portion H is restrained by the airbag rear surface 42R of the main body airbag 42.

On the other hand, at the time of an oblique collision with respect to the front occupant's seat side, as shown by arrow K in FIG. 3, the occupant head portion H moves toward a vehicle obliquely front side while heading toward the region of the collision of the vehicle front surface. More concretely, as shown by arrow K, the occupant head portion H moves toward the vehicle front side and the vehicle transverse direction right side (the vehicle transverse direction central side). This occupant head portion H passes between the pair of side portion chambers 50, and, as shown by arrow K, contacts the outer peripheral side of the airbag rear surface 42R of the main body airbag 42. Or, the occupant head portion H contacts the airbag rear surface 42R and the inner side surface 50S of one of the side portion chambers 50.

Figure 6A:
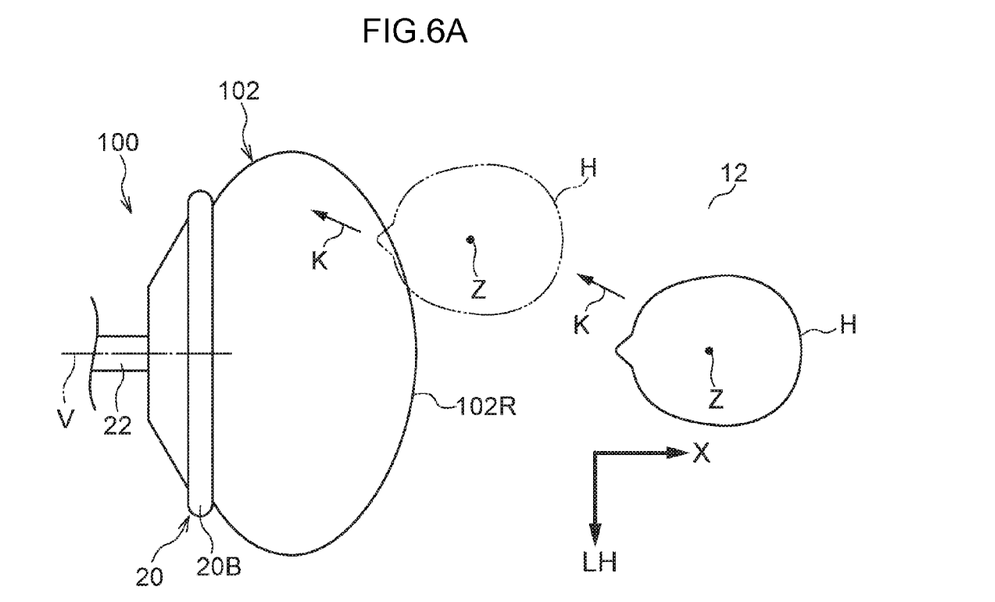
FIG. 6A is a top view corresponding to FIG. 3 and showing a driver's seat airbag relating to a comparative example.
Figure 6B:
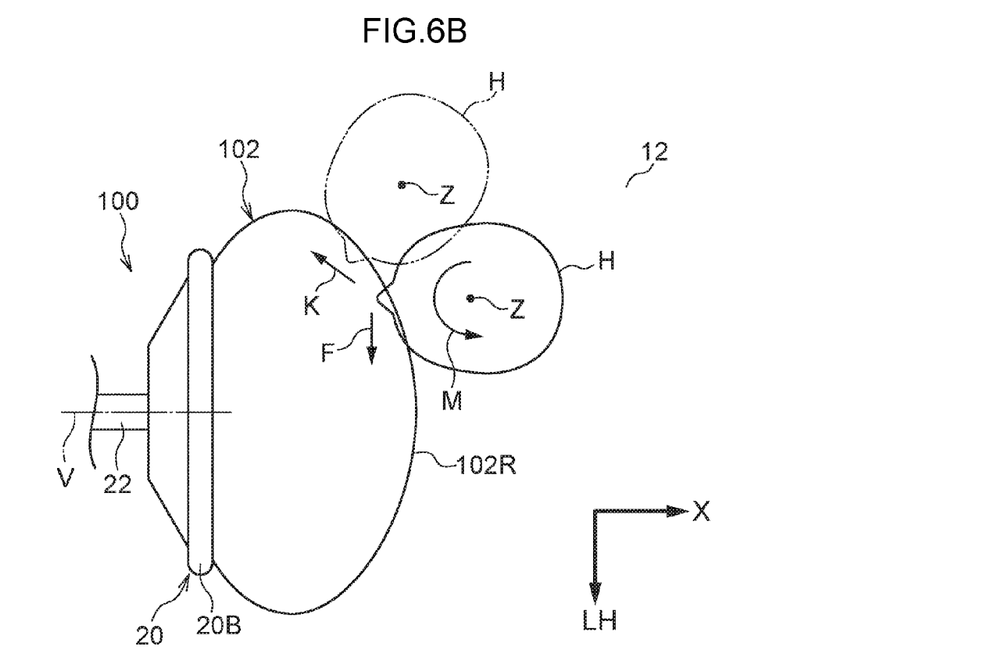
FIG. 6B is a top view corresponding to FIG. 3 and showing the driver's seat airbag relating to the comparative example.

Here, an airbag device for a driver's seat relating to a comparative example is described in order to further clarify the operation of the airbag device 10 for a driver's seat relating to the present embodiment. As shown in FIG. 6A and FIG. 6B, in an airbag device 100 for a driver's seat relating to the comparative example, in conjunction with any of various types of collisions, a driver's seat airbag 102 is inflated and deployed at the vehicle rear side of the steering wheel 20. Note that the airbag device 100 for a driver's seat does not have structures corresponding to the pair of side portion chambers 50 of the present embodiment.

At the time of an oblique collision with respect to the front occupant's seat side, as shown by arrow K in FIG. 6A, the occupant head portion H moves toward a vehicle obliquely front side toward the collided portion of the vehicle front surface. Due thereto, as shown by the two-dot chain line, the occupant head portion H contacts the outer peripheral side of an airbag rear surface 102R of the driver's seat airbag 102. In this case, the occupant head portion H moves toward the vehicle transverse direction right side along the airbag rear surface 102R, and there is the possibility that the occupant head portion H will contact an interior fitting part such as an unillustrated instrument panel or the like. Further, as shown by the two-dot chain line in FIG. 6B, there is the possibility that the occupant head portion H will rotate around axis Z along the vertical direction of the occupant head portion H.

Concretely, as shown by arrow K in FIG. 6B, when the occupant head portion H contacts the outer peripheral side of the airbag rear surface 102R of the driver's seat airbag 102, frictional force F that is directed toward the vehicle transverse direction left side (the arrow LH side) is generated at the portion of contact of the occupant head portion H with the airbag rear surface 102R. Moment M, that rotates the occupant head portion H around the axis Z such that the occupant head portion H faces the vehicle transverse direction left side, is generated by the frictional force F. As a result, there is the possibility that the occupant head portion H will rotate around the axis Z as shown by the two-dot chain line.

In contrast, in the airbag device for a driver's seat relating to the present embodiment, as shown in FIG. 3, the pair of side portion chambers 50 are provided at the side portions 42S at the vehicle transverse direction both sides of the main body airbag 42. The pair of side portion chambers 50 receive a supply of gas from the main body airbag 42, and are respectively inflated and deployed toward the vehicle rear side from the side portions 42S at the both sides of the main body airbag 42.

Due thereto, the occupant head portion H, that has moved toward a vehicle obliquely front side in conjunction with an oblique collision, can be received by one of the pair of side portion chambers 50 (the side portion chamber 50E1 in FIG. 3). Accordingly, contact of the occupant head portion H and an interior fitting part such as the unillustrated instrument panel or the like is suppressed.

Further, when the occupant head portion H contacts the airbag rear surface 42R of the main body airbag 42, the main body airbag 42 is compressed, and gas at the interior of the main body airbag 42 is supplied via the plural connection holes 52 (see FIG. 4A) to the interiors of the pair of side portion chambers 50. Due thereto, the pair of side portion chambers 50 are inflated and deployed at an early stage, and therefore, the occupant head portion H can be restrained by the side portion chamber 50 that has been inflated and deployed to a predetermined internal pressure.

Moreover, the rear portions 50T of the pair of side portion chambers 50 and the main body airbag 42 are connected by the pair of regulating tethers 60 respectively. Due thereto, in a case in which the side portions chamber 50 is pushed toward a vehicle obliquely front side by the occupant head portion H, collapsing of the side portion chamber 50 toward the side (the arrow D side) away from the center C of the main body airbag 42 in the vehicle transverse direction is suppressed.

Still further, the connection holes 52 are provided at the upper portions 50A of the side portion chambers 50. Due thereto, the upper portions 50A of the side portion chambers 50 are inflated and deployed before the lower portions 50B of the side portion chambers 50. Therefore, in the present embodiment, the regulating tethers 60 can be expanded into a predetermined shape at an early stage, as compared with a case in which the connection holes 52 are provided at the lower portions of the side portion chambers 50. Accordingly, collapsing of the side portion chambers 50 can be regulated at an early stage by the regulating tethers 60.

Further, as shown in FIG. 1, the center of gravity G of the occupant head portion H overlaps with the side portion chambers 50, when the head portion contacting state is viewed from the vehicle transverse direction outer side. Due thereto, in a case in which the occupant head portion H moves toward a vehicle obliquely front side in conjunction with an oblique collision, the center of gravity G of the occupant head portion H can be received by the side portion chamber 50.

Moreover, the chamber side connecting portions 60B of the regulating tethers 60 are positioned further toward the vehicle rear side than the center of gravity G of the occupant head portion H. Due thereto, collapsing of the side portion chambers 50 can be suppressed effectively as compared with a case in which the chamber side connecting portions 60B are positioned further toward the vehicle front side than the center of gravity G of the occupant head portion H.

Still further, as shown in FIG. 3, when the main body airbag 42 is viewed from the height direction upper side, the main body side connecting portion 60A of the one regulating tether 60E1 is positioned at the side opposite the one side portion chamber 50E1, with respect to the central line CL2 of the main body airbag 42.

Here, when the occupant head portion H contacts the one side portion chamber 50E1 side with respect to the central line CL2 of the main body airbag 42 in conjunction with an oblique collision, the one side portion chamber 50E1 side of the main body airbag 42 is crushed. In this case, if the main body side connecting portion 60A of the one regulating tether 60E1 is positioned at the one side portion chamber 50E1 side of the main body airbag 42, in conjunction with the crushing of the one side portion chamber 50E1 side of the main body airbag 42, the main body side connecting portion 60A moves, and there is the possibility that flexure will arise at that regulating tether 60E1. If flexure arises at the one regulating tether 60E1, the time until the collapsing of the one side portion chamber 50E1 is regulated by that regulating tether 60E1 will be delayed.

In contrast, in the present embodiment, as described above, when the main body airbag 42 is viewed from the height direction upper side, the main body side connecting portion 60A of the one regulating tether 60E1 is positioned at the side opposite the one side portion chamber 50E1 with respect to the central line CL2 of the main body airbag 42. Due thereto, even if the one side portion chamber 50E1 side of the main body airbag 42 is crushed, the amount of movement of the main body side connecting portion 60A of the one regulating tether 60E1 is small, and therefore, flexure of that regulating tether 60E1 is suppressed. Accordingly, collapsing of the one side portion chamber 50E1 can be regulated at an early stage by the one regulating tether 60E1. This is the same for the regulating tether 60E2 that regulates collapsing of the other side portion chamber 50E2.

Further, as shown in FIG. 1, when the head portion contacting state is viewed from the vehicle transverse direction outer side, the chamber side connecting portions 60B and the main body side connecting portions 60A are positioned further toward the vehicle upper side than the occupant head portion H (the top portion H1). Due thereto, when the occupant head portion H moves toward the vehicle front side or a vehicle obliquely front side in conjunction with a collision, the occupant head portion H interfering with the regulating tethers 60 is suppressed. Accordingly, damage to the regulating tethers 60 is suppressed.

Moreover, rotation of the occupant head portion H around the axis Z is suppressed due to the right side surface of the occupant head portion H being received by the inner side surface 50S of the side portion chamber 50. In addition, as shown in FIG. 3, frictional force Q that is directed toward the vehicle rear side arises at the portion of contact, that contacts the inner side surface 50S of the side portion chamber 50, at the occupant head portion H. The moment N that rotates the occupant head portion H around the axis Z is generated by the frictional force Q such that the occupant head portion H faces the vehicle transverse direction right side. Namely, the moment N that cancels the above-described moment M is generated at the occupant head portion H. As a result, rotation of the occupant head portion H around the axis Z is suppressed.

Further, in the present embodiment, as described above, at the time of a full overlap collision, the occupant head portion H that has moved toward the vehicle front side passes between the pair of side portion chambers 50, and contacts the airbag rear surface 42R of the main body airbag 42. Namely, at the time of a full overlap collision, the occupant head portion H can be restrained by the main body airbag 42 without being affected by the pair of side portion chambers 50. Accordingly, in the present embodiment, rotation of the occupant head portion H around the axis Z at the time of an oblique collision can be suppressed, while the performance of restraining the occupant head portion H at the time of a full overlap collision is ensured.

Further, as described above, gas is supplied from the interior of the main body airbag 42 via the connection holes 52 to the interiors of the pair of side portion chambers 50. Therefore, the pressure of the interior of the side portion chamber 50 (the internal pressure) at the time when the occupant head portion H contacts the inner side surface 50S of the side portion chamber 50 can be adjusted by changing the number of or the size of the connection holes 52. Namely, by changing the number of or the size of the connection holes 52, the force by which the inner side surface 50S of the side portion chamber 50 restrains the occupant head portion H can be adjusted. Accordingly, rotation of the occupant head portion H around the axis Z can be suppressed more effectively.

Moreover, the pair of side portion chambers 50 are provided at the side portions 42S at the vehicle transverse direction both sides of the head portion contact region 42R1 of the main body airbag 42. Due thereto, the left and right occupant shoulder portions S of the occupant P, who has moved toward the vehicle front side or the like in conjunction with a full overlap collision or an oblique collision, interfering with the pair of side portion chambers 50 is suppressed. Accordingly, the occupant head portion H can be restrained effectively by the airbag rear surface 42R of the main body airbag 42.

Modified examples of the above-described embodiment are described next.

Figure 7:
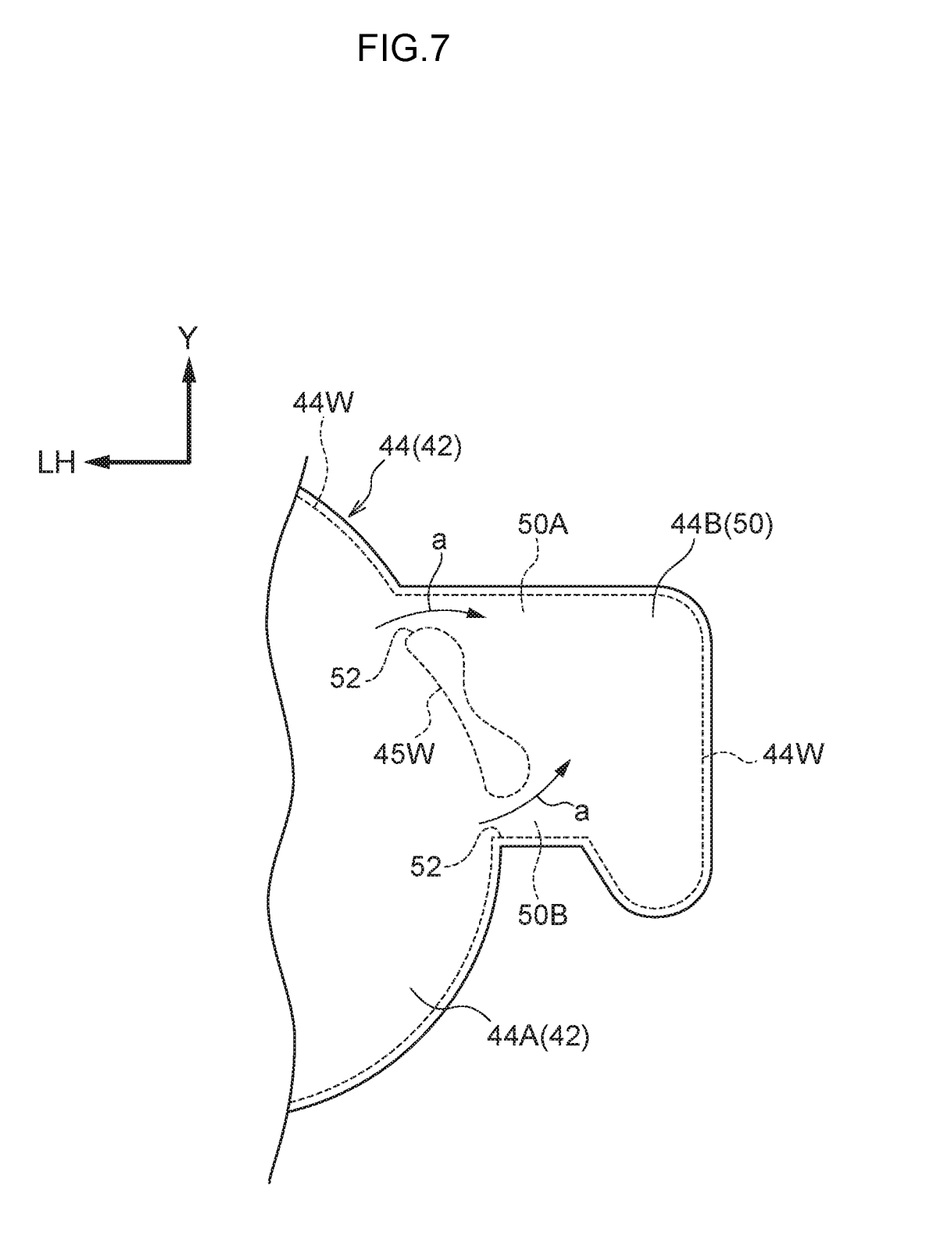
FIG. 7 is a planarly expanded view that shows a modified example of the opposite-occupant-side base cloth of the driver's seat airbag shown in FIG. 1, and that corresponds to FIG. 4A, and that illustrates main portions in an enlarged manner.

In the above-described embodiment, the connection holes 52 are provided at the upper portions 50A of the side portion chambers 50. However, the above-described embodiment is not limited to this. As shown in FIG. 7, it is also possible to provide the connection holes 52 respectively at the upper portion 50A and the lower portion 50B of the side portion chamber 50. In this case, gas is supplied to the upper portion 50A and the lower portion 50B (see FIG. 1) of the side portion chamber 50 from the upper and lower connection holes 52. Due thereto, the side portion chamber 50 can be stably inflated and deployed into a predetermined shape. Note that, in the example shown in FIG. 7, the connection holes 52 are provided respectively at the upper portion 50A and the lower portion 50B of the side portion chamber 50, due to a joined portion 45W that is shaped as an island and is sewn in an annular shape.

Further, in the above-described embodiment, the pair of side portion chambers 50 are provided at the edge portions 42S1 at the vehicle transverse direction both sides of the head portion contact region 42R1 of the main body airbag 42. However, the above-described embodiment is not limited to this. The pair of side portion chambers 50 can be provided at the side portions 42S at the vehicle transverse direction both sides of the main body airbag 42. Accordingly, the pair of side portion chambers 50 can be provided, for example, at the edge portions at the vehicle transverse direction both sides at the shoulder portion contact region 42R2.

Further, in the above-described embodiment, the pair of side portion chambers 50 are provided at the side portions 42S at the vehicle transverse direction both sides of the main body airbag 42, but the above-described embodiment is not limited to this. The side portion chambers 50 can be provided at at least one of the side portions 42S at the vehicle transverse direction both sides of the main body airbag 42.

Further, in the above-described embodiment, the regulating tethers 60 are connected to the upper surface 42U of the main body airbag 42 and to the upper surfaces 50U of the rear portions 50T of the side portion chambers 50. However, the above-described embodiment is not limited to this. The positions at which the regulating tethers 60 are connected to the main body airbag 42 and the side portion chambers 50 can be changed appropriately. For example, the regulating tethers 60 may be connected to the upper surfaces 50U at the front-rear direction intermediate portions of the side portion chambers 50. Further, it is also possible to provide the regulating tethers 60 at the interior of the main body airbag 42 and the interiors of the side portion chambers 50.

Further, in the above-described embodiment, operation and effects that are similar to those described above can be obtained also at the time of an oblique collision or a small overlap collision with respect to the driver's seat side, and are not limited to collisions with respect to the front occupant's seat side of a left-hand drive vehicle.

Further, in the above-described embodiment, the steering wheel 20 and the unillustrated driver's seat are provided at the left front side with respect to the vehicle transverse direction center of the cabin 12, but the above-described embodiment is not limited to this. The steering wheel 20 and the unillustrated driver's seat may be provided at the right front side with respect to the vehicle transverse direction center of the cabin 12.

Although an embodiment of the present disclosure has been described above, the present disclosure is not limited to this embodiment, and the embodiment and various modified examples may be used by being combined together appropriately. Further, the present disclosure can, of course, be embodied in various forms within a scope that does not depart from the gist thereof.

What is claimed is:

1. An airbag device for a driver's seat, comprising:
    a steering wheel that is rotatably supported at a vehicle body;
    a wheel pad portion that is provided at a central portion of the steering wheel, and that does not rotate with respect to the vehicle body;
    a main body airbag that is accommodated within the wheel pad portion, and that is configured to receive a supply of gas and to be inflated and deployed at a vehicle rear side of the steering wheel;
    a side portion chamber that is provided at a side portion in a vehicle transverse direction of the main body airbag, and that is configured to receive a supply of gas from the main body airbag and to be inflated and deployed from the side portion of the main body airbag toward the vehicle rear side; and
    a regulating tether that connects the main body airbag to a rear portion or a front-rear direction intermediate portion of the side portion chamber, and that restricts the side portion chamber from collapsing toward a side removed from a center of the main body airbag in the vehicle transverse direction, wherein:
    the regulating tether has a main body side connecting portion that is connected to the main body airbag, and a chamber side connecting portion that is connected to the side portion chamber,
    when the main body airbag, which has been inflated and deployed, is viewed from a height direction upper side of the main body airbag, the main body side connecting portion is positioned at an opposite side, in the vehicle transverse direction, from the side portion chamber with respect to a central line along a thickness direction of the main body airbag.

2. The airbag device for a driver's seat of claim 1, wherein:
    the chamber side connecting portion is positioned further toward the vehicle rear side than a center of gravity of an occupant head portion, when viewing, from a vehicle transverse direction outer side, a head portion contacting state in which the occupant head portion, which faces a vehicle front side, is made to contact both a rear surface at the vehicle rear side of the main body airbag that has been inflated and deployed and an inner side surface at a main body airbag side of the side portion chamber that has been inflated and deployed.

3. The airbag device for a driver's seat of claim 1, wherein:
    the chamber side connecting portion is provided at an upper surface of the side portion chamber,
    the main body side connecting portion is provided at an upper surface of the main body airbag, and
    when the head portion contacting state is viewed from the vehicle transverse direction outer side, the chamber side connecting portion and the main body side connecting portion are positioned further toward a vehicle upper side than the occupant head portion.

4. The airbag device for a driver's seat of claim 3, wherein, when the head portion contacting state is viewed from the vehicle transverse direction outer side, the chamber side connecting portion and the main body side connecting portion are positioned further toward the vehicle upper side than a top portion of the occupant head portion.

5. The airbag device for a driver's seat of claim 2, wherein, when the head portion contacting state is viewed from the vehicle transverse direction outer side, the center of gravity of the occupant head portion overlaps with the side portion chamber.

6. The airbag device for a driver's seat of claim 5, wherein, when the head portion contacting state is viewed from the vehicle transverse direction outer side, the side portion chamber overlaps with the entire occupant head portion.

7. The airbag device for a driver's seat of claim 1, wherein:
    the main body airbag is inflated and deployed between the steering wheel and an occupant head portion of an occupant seated in a driver's seat;
    a rear surface at the vehicle rear side of the main body airbag that is in an inflated and deployed state has:
        a head portion contact region that is contacted by the occupant head portion of the occupant, who has moved toward a vehicle front side in conjunction with a front collision, and
        a shoulder portion contact region that is contacted by an occupant shoulder portion of the occupant who has moved toward the vehicle front side in conjunction with the front collision; and
    the side portion chamber is provided at the side portion in the vehicle transverse direction at the head portion contact region of the main body airbag.

8. The airbag device for a driver's seat of claim 7, wherein, when the main body airbag that is in the inflated and deployed state is viewed from a thickness direction rear side of the main body airbag, a region, which is at a vehicle upper side of the main body airbag with respect to a central line along the vehicle transverse direction that passes through a center of the main body airbag, comprises the head portion contact region, and a region at a vehicle lower side of the main body airbag with respect to the central line comprises the shoulder portion contact region.

9. The airbag device for a driver's seat of claim 1, wherein the regulating tether is stretched between the main body airbag and the side portion chamber, in conjunction with inflation and deployment of the main body airbag and the side portion chamber.

10. The airbag device for a driver's seat of claim 1, wherein the side portion chamber is respectively provided at the side portions at both vehicle transverse direction sides of the main body airbag.

11. The airbag device for a driver's seat of claim 1, wherein a connection hole, which connects an interior of the main body airbag and an interior of the side portion chamber, is formed in the main body airbag and the side portion chamber.

12. The airbag device for a driver's seat of claim 11, wherein the connection hole connects the interior of the main body airbag to an upper portion of the side portion chamber.

13. The airbag device for a driver's seat of claim 1, wherein a plurality of connection holes, which respectively connect an interior of the main body airbag to an upper portion or a lower portion of the side portion chamber, are formed in the main body airbag and the side portion chamber.

14. The airbag device for a driver's seat of claim 1, wherein the regulating tether is formed in a shape of a strip.

15. The airbag device for a driver's seat of claim 1, wherein, when an inflated and deployed state of the main body airbag is viewed from a thickness direction rear side of the main body airbag, an outer diameter of the main body airbag is larger than an outer diameter of a rim of the steering wheel.

16. The airbag device for a driver's seat of claim 1, further comprising an inflator that is provided at the steering wheel and that is configured to supply gas to the main body airbag.

17. The airbag device for a driver's seat of claim 16, wherein the side portion chamber is configured to be inflated and deployed by receiving a supply of gas from the inflator via the main body airbag.

18. The airbag device for a driver's seat of claim 1, wherein, when an inflated and deployed state of the main body airbag is viewed from a thickness direction rear side of the main body airbag, the main body airbag is formed in a circular shape.

* * * * *